United States Patent
Price et al.

(10) Patent No.: US 7,463,977 B2
(45) Date of Patent: Dec. 9, 2008

(54) LOCATION-RELEVANT REAL-TIME MULTIMEDIA DELIVERY AND CONTROL AND EDITING SYSTEMS AND METHODS

(75) Inventors: Chris Price, Austin, TX (US); Lee Little, Austin, TX (US); Carrie Little, Austin, TX (US)

(73) Assignee: Barz Adventures LP, Austin, TX (US)

( * ) Notice: Subject to any disclaimer, the term of this patent is extended or adjusted under 35 U.S.C. 154(b) by 358 days.

(21) Appl. No.: 11/362,486

(22) Filed: Feb. 24, 2006

(65) Prior Publication Data

US 2007/0208749 A1 Sep. 6, 2007

(51) Int. Cl.
*H04Q 7/20* (2006.01)
*G01C 21/00* (2006.01)

(52) U.S. Cl. .................... 701/211; 701/200; 455/456.1; 455/414.1

(58) Field of Classification Search .............. 455/456.1, 455/414.1; 701/200, 211
See application file for complete search history.

(56) References Cited

U.S. PATENT DOCUMENTS

| | | | | |
|---|---|---|---|---|
| 5,767,795 | A * | 6/1998 | Schaphorst | 340/988 |
| 6,085,148 | A * | 7/2000 | Jamison et al. | 701/211 |
| 6,266,614 | B1 * | 7/2001 | Alumbaugh | 701/211 |
| 2003/0009281 | A1 * | 1/2003 | Whitham | 701/211 |
| 2004/0104842 | A1 * | 6/2004 | Drury et al. | 342/357.13 |
| 2005/0096843 | A1 * | 5/2005 | Del Monte, Jr. | 701/211 |
| 2005/0192025 | A1 * | 9/2005 | Kaplan | 455/456.1 |

* cited by examiner

*Primary Examiner*—Mark Hellner
(74) *Attorney, Agent, or Firm*—The Law Firm of H. Dale Langley, Jr. P.C.

(57) ABSTRACT

A system for providing a tour of a venue includes a central computer for creating the tour, at least one venue server computer, communicatively connected to the central computer remotely at the venue, for storing the tour, and at least one portable device, communicatively connected to the venue server computer at the venue, for obtaining the tour from the venue server computer. The at least one portable device includes a GPS receiver or other geographic location identifier. Particular "point of interest"-specific content of the tour is output by the portable device whenever the device is located at the geographical location of the coordinates for the point of interest. The specific content of the tour so output by the portable device includes multimedia, including, for example, text, graphics, audio, video, and others. The portable device is carried by a tourist or other user and provides interactive multimedia to guide during the tour. Tours are created and edited at the central computer, and then communicated to the venue server computer. The venue server computer is located at or near the venue of the tour, and thereat writes the relevant tour or tours to the portable device. The venue server computer includes security, control and payment systems for access to use the portable device. The portable device logs usage information for the device, and this information is communicated back to the venue server computer and on to the central computer.

4 Claims, 11 Drawing Sheets

LOCATION-RELEVANT REAL-TIME MULTIMEDIA DELIVERY AND CONTROL AND EDITING SYSTEMS AND METHODS

BACKGROUND OF THE INVENTION

The present invention generally relates to location-relevant information delivery systems and methods and, more particularly, relates to systems and methods of real-time location determination, location-relevant information display, user-interactive interfaces for selection of particular location-relevant information, and centralized editing and control of portable devices therefor.

Mapping and certain location information is accessible through the Internet, but requires Internet connectivity. User-interactivity and selection options for such mapping and information are limited to whatever may be available over the Internet. Various modularized/application-specific mapping, charting, trip planning, and similar software programs are available for operation on desktop or laptop computers. These software programs, however, must be purchased or obtained and installed on the computer, and the computer operating the software must be available in order to use the software. Automobiles and other transport vehicles are sometimes equipped with displays of electronic maps and/or security and emergency services communications and access devices (e.g., the OnStar™ service in high-end automobiles). These vehicle features are limited to providing or displaying only limited and specific information for the select purposes of the maps and security/emergency services.

The global positioning system (GPS) of the U.S. Department of Defense, operable via satellite and satellite communications, has made it possible with proper equipment to quite specifically and accurately obtain geographic location coordinates. Portable GPS devices communicate via the satellite system to derive the coordinates, and certain of these devices include databases for electronic map displays for the applicable coordinates. The portable GPS devices can be carried by a user to ascertain geographic coordinates of the device and, in certain cases, maps of the locales and surroundings for those coordinates.

The foregoing systems and devices have proven useful to travelers and others for detecting location and route determination. The systems and devices have operated by GPS and/or cellular or other wireless communications and the like. Although the conventional systems and devices can be useful, they are generally very limited in application to mapping, routing, and emergency and security service.

Others have attempted to facilitate information delivery to portable devices used by individuals, for example, certain news, information, multimedia, and other content can be accessed or obtained by certain portable devices having Internet or other applicable network access. Typically, the delivery of this information to these devices has been made through localized wireless (e.g., 802.11), cellular wireless (e.g., CDPD), or wired communications (e.g., telephone line modem access). Certain of this information that is delivered to these devices can be relevant to location of the device, such as via query or other selection by the individual user of the portable device. The substance of this information, however, is conventionally not particularly tailored or specifically relevant to user and device location.

Certain museums or other sites provide automated guided tour systems. These systems have been similarly operated through point-located information (e.g., posted text content or audio/video dissemination at select point-specific locations), localized communication via infrared or the like at point-specific locations (e.g., via kiosk or walk-by accessibility), programmed continuous information delivery (e.g., tape recorded information), and similar systems. These systems that provide automated tour guiding are not readily editable or changeable, as they are conventionally point-specific arrangements and can be varied in design and equipment. Additionally, these systems are not capable of wider-area usage beyond the localized availability of the point-located information and particular delivery facilities therefor.

Certain attempts to provide location-relevant information delivery systems have been made, for example, as described in International Publication No. WO 01/86613, of Pepin, et al., titled "Portable Multimedia Tourist Guide". In these attempts, GPS receivers are integrated with certain processing capability in order to correlate location data obtained via the GPS with limited data regarding a certain "precise site" or particular point of interest (e.g., device audibly informs a tourist crossing a bridge of the name of the bridge and a point of interest to the right, and the user can query through a device interface for certain text or other limited data regarding the tourist's location). These integration attempts have been hampered and quite restricted because of technological limitations, for example, information available at any location point is limited to what may be then available on a very small storage (e.g., RAM memory, Flash memory, or PCMCIA card memory), or as otherwise from time to time accessed via wireless communications in a client-server arrangement.

These technological limitations restrict usefulness to only certain high-density urban points, only precise sites at any given instance, timing delays required for obtaining additional/supplemental information about a location point or next location point, requirement of ancillary computer carried by the tourist with USB port for download of next information "since one can download only certain predetermined information instead of downloading the whole database", overwrite of prior information, battery life, and lack of security or controls on devices, information, and use. In fact, it has been concluded by others that, in these foregoing attempts, it "would be impractical to pre-store all necessary information for a given trip" and any "static storage device would very quickly become outdated and would need to be replaced." Basically, these prior attempts to provide tour information have been little more than a portable device, having limited memory and features, which can from time to time download various snippets of information from a laptop computer carried together with the portable device.

It would, therefore, be a significant advance and improvement in the art and technology to provide location-relevant real-time information systems and methods. It would also be a significant improvement and advance to provide complete tour data via a handheld device, together with security and control of the device, data, and use. Additionally, advantages and improvements of expanded and feature-rich multimedia, editing, complete tour design, and comprehensive and complete tour guides, would make the location-relevant real-time information and systems more robust, diverse, useful, secure, marketable, and user friendly. The present invention provides numerous advantages and improvements, including improvements and nuances in the foregoing respects.

SUMMARY OF THE INVENTION

An embodiment of the invention is a system for providing a tour of a venue. The system includes a central computer for creating the tour, one or more venue server computers communicatively connected to the central computer remotely at the venue for storing the tour, and one or more portable devices communicatively connected to the venue server computer at the venue for obtaining the tour from the venue server computer.

In other aspects, the system further includes a relational database for correlating geographic locations to point of interest content, and the central computer includes a processor, an editor connected to the processor for programming and editing the tour to include multimedia content, and a controller connected to the processor for delivering the tour to the venue server computer.

In further aspects, the portable device of the system includes a log of usage data for the portable device, and the central computer further includes a reporter connected to the processor for obtaining and storing the log from the portable device.

In yet other aspects, the venue server computer of the system includes a venue server processor, a central computer synchronizer connected to the venue server processor for communicatively synchronizing the tour then-maintained at the venue server computer with the tour then-maintained at the central computer, and a guide device synchronizer connected to the venue server processor for communicatively synchronizing the tour then-maintained at the venue server computer with the tour then maintained at the guide device.

In other aspects, the portable device of the system includes a log of usage data for the portable device, and the venue server computer includes a guide device controller connected to the venue server processor for checking-in and checking-out the guide device from the venue server computer and for reading the then-maintained log information for the client device to the venue server computer.

In other aspects, the portable device of the system includes a portable device processor, a log of usage data for the portable device communicatively connected to the portable device processor, the tour communicatively connected to the portable device processor, a user interface communicatively connected to the portable device processor for outputting content of the tour and for receiving input to direct the tour, and a geographic location identifier communicatively connected to the portable device processor for automatically controlling the tour in response to applicable geographic location of the portable device.

In further aspects, the geographic location identifier of the system includes a GPS receiver, and the portable device includes a tour content engine communicatively connected to the portable device processor for retrieving a geographic location of the portable device from the geographic location identifier, and a customer user interfacer communicatively connected to the portable device processor and the tour content engine for ascertaining the geographic location retrieved by the tour content engine and correlating and controlling output of the tour in response to the geographic location so ascertained.

Another embodiment of the invention is a method of tour guiding. The method includes creating a tour at a first location for a venue at a remote location, communicating the tour to a venue system at the venue at the remote location from the first location, providing a portable tour guide device for delivering multimedia output of the tour, connecting the portable tour guide device to the venue system at the remote location of the venue system, writing the tour to the portable tour guide device at the remote location where connected to the venue system, disconnecting the portable tour guide device from the venue system, moving the portable tour guide device within the venue as disconnected from the venue system, and outputting multimedia of the tour by the portable tour guide device.

In other aspects, the creating in the method includes identifying a geographical coordinate of a point of interest within the venue of the tour, correlating the geographical coordinate for the point of interest to certain of the tour, detecting a location of the portable tour guide device within the venue, corresponding to the geographical coordinate, and outputting the certain of the tour by the portable tour guide device, automatically, upon detecting.

In further aspects, the method includes editing the tour at the first location to obtain an edited tour, connecting the portable tour guide device to the venue system at the remote location of the venue system, overwriting the tour of the portable tour guide device by the edited tour at the remote location where connected to the venue system, disconnecting the portable tour guide device from the venue system, moving the portable tour guide device within the venue as disconnected from the venue system, and outputting multimedia of the edited tour by the portable tour guide device.

In yet other aspects, the editing in the method includes identifying the geographical coordinate of the point of interest within the venue of the edited tour, correlating the geographical coordinate for the point of interest to certain edits of the edited tour, detecting the location of the portable tour guide device within the venue corresponding to the geographical coordinate, and outputting the certain of the edited tour by the portable tour guide device, automatically, upon detecting.

In other aspects, the method includes logging a use information of the portable tour guide device by the portable tour guide device during the moving, reading the use information from the logging after the connecting, and communicating the use information from the reading by the venue system at the remote location to the first location.

In further aspects, the method includes reporting at least certain of the use information at the first location.

In other aspects, the method includes an advertisement (e.g., a non-geographical dependent data, an ad, or an item of interest that is not necessarily tour-specific in the context of the tour) in the tour in the step of creating, correlating the geographical coordinate for the point of interest to the advertisement of the tour, and outputting the advertisement by the portable tour guide device, automatically, upon the detecting.

In yet other aspects, the method includes providing an interactive user interface of the portable tour guide device wherein the interactive user interface enables input to select certain of the tour, selecting the certain of the tour via the interactive user interface of the portable tour guide device, and outputting the certain of the tour by the portable tour guide device in response to the selecting.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
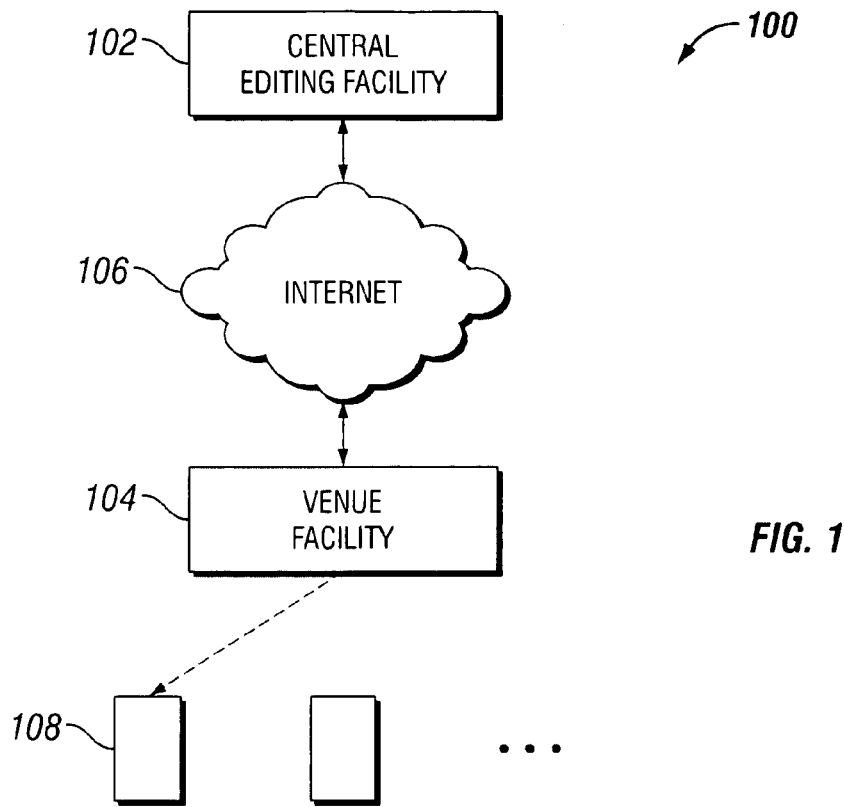
FIG. 1 illustrates a tour system, according to certain embodiments of the invention.

Referring to FIG. 1, a system 100 for complete tour guiding includes a central editing system 102 communicatively connected to at least one venue system 104. The central editing system 102 and the venue system 104 are connected by a communications link, such as a network 106, for example, the Internet, a WAN, LAN, VPN, optical, wired or wireless link, or other communications link. The central editing system (CES) 102 communicates with the venue system (VS) 104 to, in cooperation, effect control and operation of the various aspects of the system 100.

Additionally, the system 100 includes at least one portable tour guide device 108. The guide device 108 is communicatively connected to the VS 104 when being readied for portability as used in guiding a tour. When being so used in guiding a tour, the guide device 108 is usually not communicatively connected to the VS 104, and rather operates stand-alone to be carried by a user for tour guiding over a geographic area of the tour.

For purposes here, the term "tour" refers to a comprehensive multimedia program that serves as a guide and/or information source to a tourist, traveler, or other person, vehicle or thing moving about an entire geographic vicinity or venue. A tour comprises multimedia information and content that is location-relevant to each specific point throughout the entire geographic venue, wherever the tourist, traveler, or other moving person is from time to time located within the venue, and that is deliverable in real-time to and through interactivity with the person at each specific location point of the venue. The multimedia is any of a wide variety of types of content and information, including, for example, text, graphics, pictures, audio, video, and others as desired and applicable. As an example, a tour is multimedia information delivered (and deliverable, whether or not actually accessed) to a moving person, detailing a wide variety of aspects and points of interest, available to the person at each particular location within a broad geographic venue and applicable to the particular location where the person is from time to time then situated in the venue. A Washington, D.C. National Mall tour or the like, in which specific location points throughout the entire mall area are presented with point specific information about each such point, is one particular tour for example.

The CES 102 (exemplary embodiments more fully described below) is one or more computers and related peripherals and equipment. If more than one computer or related equipment, the CES 102 can include network links for communicative connection of the computers and related matters. An administrator operates and controls operations of the CES 102 to create and edit tours and to communicatively deliver the tours to the VS 104. The administrator is an automated set of instructions, such as a computer program or controller or the like, a person operating computer(s) of the CES 102, and combinations of these. Additionally, at least one editor operates on and with the CES 102, to create and edit a tour and aspects of and related to the tour. The editor(s) is an automated set of instructions, person(s) creating multimedia content, programming, and otherwise operating computer(s) of the CES 102, and/or combinations of these that create and edit via the computer(s) and facilities of the CES 102.

The VS 104 (exemplary embodiments more fully later described) is one or more computers and related peripherals and equipment that can be communicatively connected by network links or other communications link elements. The VS 104 is capable of receiving and storing one or more tours communicatively obtained from the CES 102. The VS 104 also controls, logs, checks-in and out, interfaces with VS operators 104 and controllers, writes to, and records from the at least one guide device 108 of the system 100. The VS 104 is an automated set of instructions, such as a computer program, controller, switch, or the like, and also can include a person operating computer(s) and related aspects of the VS 104. The VS 104 includes elements for communicative connection to each guide device 108, for performing the various operations of the VS 104 as to each guide device 108.

Each guide device 108 (exemplary embodiments hereinafter described in further detail) includes GPS receiver, processor, memory, operating system, database, visual display, audio output, user interface (including input and output elements), power supply, and connective socket or plug to the VS 104. The VS 104 writes to the guide device 108 a tour, when the guide device 108 is communicatively connected to the VS 104 either when first loading the tour on the guide device 108 or whenever the tour then in memory of the guide device 108 has been changed or edited. The tour runs on the guide device 108, in conjunction with operations of the GPS receiver. As the guide device 108 moves through varied geographic coordinates within the venue of the tour, the GPS detects and derives the coordinates at each point of the venue. At each such point of the venue, the guide device 108, via the processing and user interfaces, delivers to the user of the guide device 108 the various tour information of the guide device 108. Certain of the tour information of the guide device 108 is automatically output via the guide device 108, for example, as text, graphics, pictures, multimedia, pop-ups, audio, video and other multimedia formats. Other tour information of the guide device 108, including of these various formats, can be output to the user of the guide device 108 upon menu-based user input to the user interface of the guide device 108. The information is output by the guide device 108 in real-time, automatically at each location point of the venue as to much of the information and otherwise upon user request to the device 108 via the interface thereof as to further and more specific and detailed information.

As to further details, the CES 102 of the system 100 includes a tour creator and a tour editor. The tour creator assists design and implementation of tours for respective venues. The editor assists modifications of tours so created. The CES 102 also includes a controller for delivering the tours and updates to respective ones of the VS 104, as applicable for particular tour guidance and venues for each respective VS 104. The controller of the CES 102 also controls and secures operations of each respective VS 104 that is communicatively linked to the CES 102. The CES 102 can also, in certain embodiments, include various reports, analyzers, evaluators, databases and storage for providing data regarding VS 104 operations, guide device(s) 108 corresponding to each VS 104, including specifics of use and operation of each guide device 108, billing and write operations of each VS 104, and states of each VS 104 and corresponding guide device(s) 108 of each such VS 104.

Each VS 104 of the system 100 includes tour synchronizer for initiating communications with the CES 102 and assuring updated tour information, guide device 108 synchronizer for assuring all latest tour information of the VS 104 is written to the guide device(s) 108 when connected to the VS 104, and checker for controlling and recording check-in and check-out of each guide device 108 and billing and audits for guide device(s) 108. The VS 104 also includes a logger to, in cooperation with the CES 102, enable communications between the VS 104 and the CES 102, for example, for writing tours and updates to the VS 104 by the CES 102, for control of the VS 104, for reporting by the VS 104 of use data and other statistics to the CES 102. The VS 104 also includes, in certain embodiments, various reports, analyzers, statisticians, storage, databases, and interfaces for operators of the VS 104 and for connecting the VS 104 to respective guide device(s) when being checked-in and checked-out and otherwise when not being used portably for active tour guiding.

The guide device(s) 108 each include tours, memory, processor, user interface for input and output, visual display, audio output, and applicable software, multimedia peripherals and drivers, codecs, input device, and interfaces for connecting to the VS 104, for running tour programs on and tourist interactivity with the device 108 and for check-in and -out, updating, and reporting for the device 108. In certain embodiments, the guide device 108 also includes remote connectors, such as wireless connectors and the like operable during portable use of the device 108.

In operation of the system 100, the CES 102 creates, edits and delivers the applicable tour (or tours) to each VS 104. The CES 102 also stores tours, content, and other data, and provides accessibility to the data. The data includes multimedia, other content, software, features, and reported information from the VS 104. Upon completed creation of a tour, the tour is communicated to the VS 104 by the CES 102, upon initiation by the CES 102 and/or the VS 104. Similarly, upon completed creation of an edit to the tour, the edited tour, or portions thereof, is communicated to the VS 104 by the CES 102 in the same manner.

The VS 104 receives and stores tours and edits that are received from the CES 102. When a guide device 108 is communicatively connected to the VS 104 and checked-in, and the particular tour applicable for the guide device 108 has been received by the VS 104 and is different or edited from the tour then of the guide device 108, the VS 104 writes the different or edited tour (or parts thereof, as appropriate) to the guide device 108. Also, during the period that the guide device 108 is communicatively connected to the VS 104 and checked-in, the status, statistics, usage data, and similar report information of the guide device 108 is transferred to the VS 104. The VS 104, upon initiation of next communications between the VS 104 and the CES 102, transfers to the CES 102 the report information then maintained by the VS 104 for the respective guide device(s) 108.

At the time that the guide device 108 is to be used portably by a tourist or other for tour guiding, the VS 104 effects billing and check-out of the device 108 in order for the device 108 to be useable with the tour. After the guide device 108 is used for the tour, the user returns the guide device 108 to the VS 104. The VS 104 then obtains from the guide device 108 data regarding the usage, including, for example, statistics, points of interest, time periods, and other information as applicable. The VS 104 thereafter saves the data regarding usage, compiles the data with other such data from all guide device(s) 108 of the respective VS 104 if applicable, and can communicate the data or compilations thereof, as applicable, to the CES 102 during communications between the CES 102 and the VS 104.

Each guide device 108 being portably used for tour guiding delivers to the user location-relevant information and content, in real time, at points of interest for the user within the venue of the applicable tour. Certain of the information and content is automatically delivered to the user as multimedia, whenever the user enters a geographic location (as determined by the GPS of the device 108) within a prescribed radius of a point of the applicable tour. Within each such prescribed radius, the user is also prompted to and can otherwise input to the device 108 to receive output by the device 108 of further and additional multimedia information and content. Moreover, various additional information and content can be made available to the user throughout the tour or portions thereof, according to the tour design and features.

Figure 2:
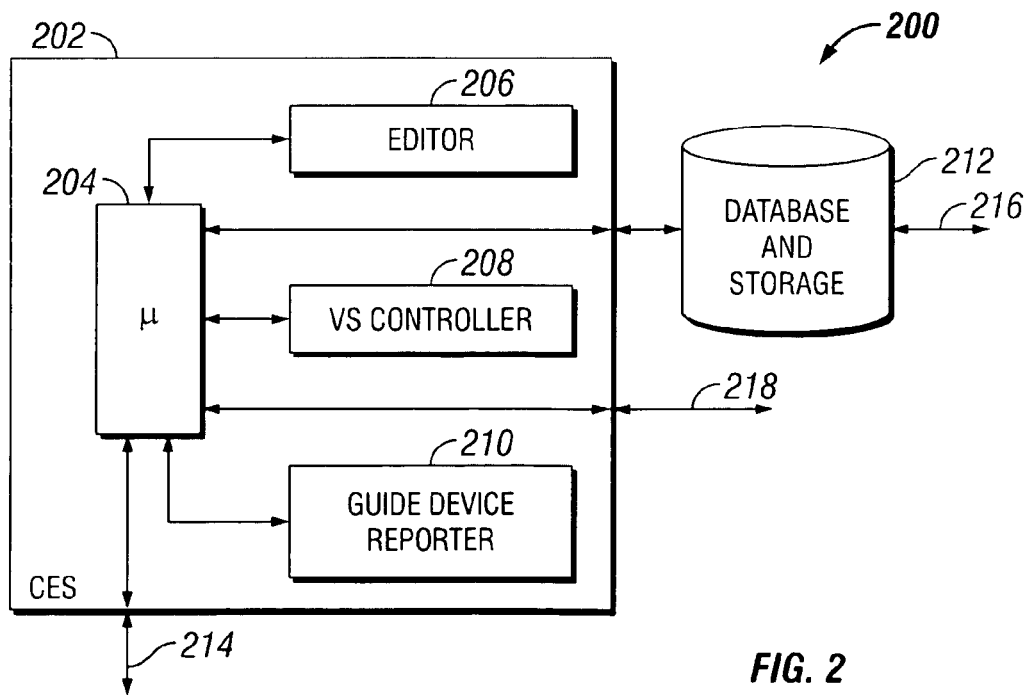
FIG. 2 illustrates a central editing system of the tour system of FIG. 1, according to certain embodiments of the invention.

Further details of certain exemplary embodiments of the system 100 are hereafter described:

The Central Editing System:

Referring to FIG. 2, an example CES 200, such as the type of the CES 102 of FIG. 1, includes at least one computer 204 having at least one microprocessor, memory and storage, operating system, administration and editing accounts and security, and peripherals such as input and output devices, printers, and the like. All these elements are interconnected for communications therebetween, and the elements can be networked, for example, via LAN, WAN, or the like. The CES 200 additionally has an editor 206, a venue system (VS) controller 208, and a guide device reporter 210, each communicatively connected to the computer. The editor 206, VS controller 208 and guide device reporter 210 are each software and/or hardware of the CES 200, and can be included within the computer 204 (as illustrated in FIG. 2 by the box 202) or can otherwise be communicatively connected to the computer 204 externally to the computer 204.

The computer 204 of the CES 200 is additionally communicatively connected to a database 212. The database 212 can also either be included within the computer 204 or can otherwise be communicatively connected externally to the computer 204, for example, via a network, the Internet, or the like (as illustrated in FIG. 2). The database 212 is hardware and/or software, and is capable of maintaining data in a corresponding relationship for use by the CES 200 for purposes of the system 100 (shown in FIG. 1). For example, the database 212 is a relational database, such as a SQL database like MySQL™, Oracle™, SQL Server™ or another.

The computer 204 of the CES 200 includes external interfaces to at least provide for a WAN network connection 214, such as the Internet, the database 212 connection, and other external connector(s) 218, such as USB, wired and/or wireless LAN, and others. The database 212, if externally located to the computer 202, can itself have separate processing systems and the like, and can have its own external connectivities 216. As mentioned, the computer 204 has features for input and output and the like, although not shown in detail in FIG. 2.

Editor:

The editor 206 of the CES 200 is a software program and/or hardware. The editor 206 creates tour of multimedia content and information, and provides for input and output of content, information, programs, and the like. The editor 206 operates through processing and communications of the computer 204. The editor 206 is automatically operable in certain instances, and is operable by human input in other instances. The editor 206 includes a user interface that steps through the tour creation and editing process of the editor 206.

Figure 3:
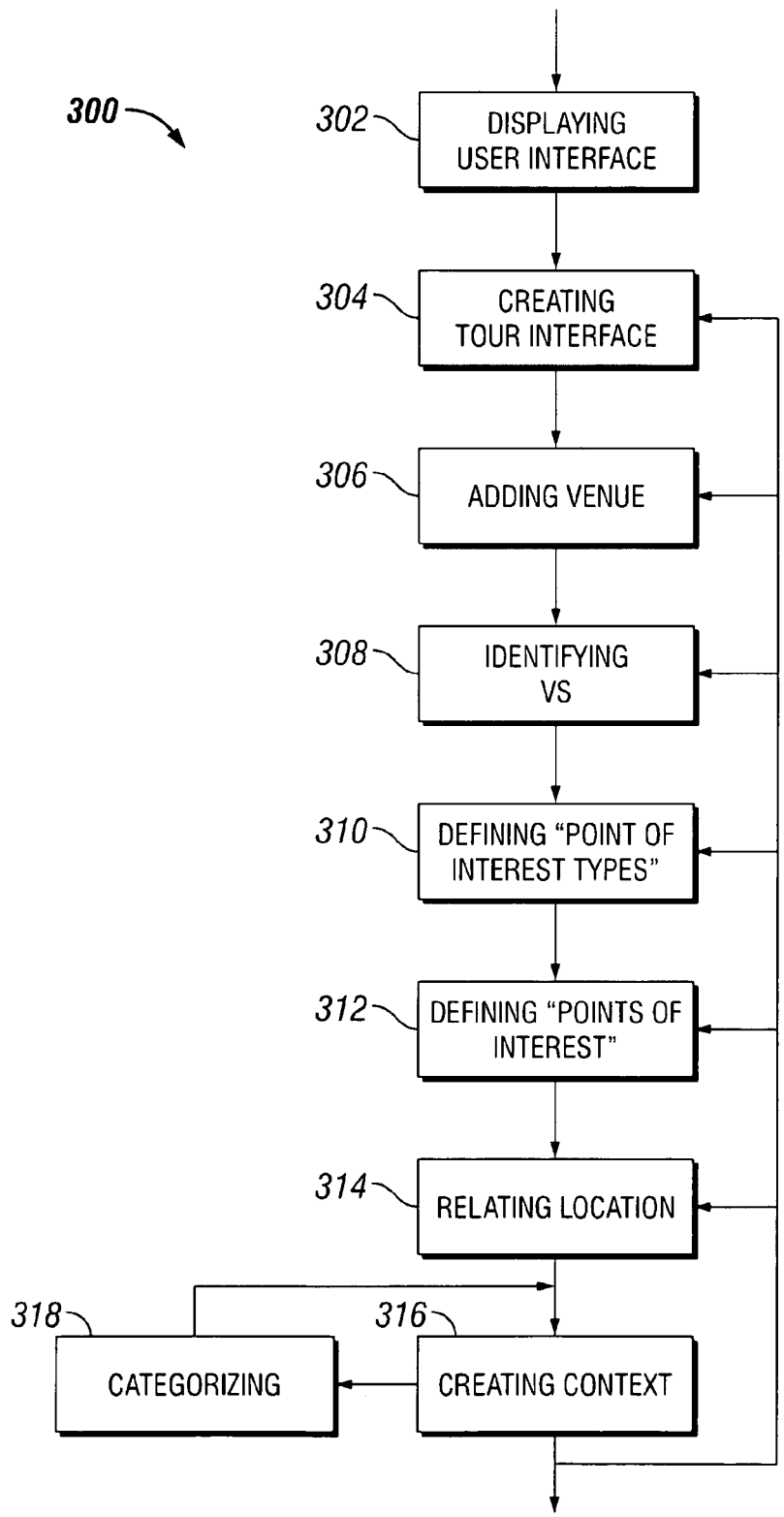
FIG. 3 illustrates a method of an editor of the central editing system of FIG. 2, according to certain embodiments of the invention.

Referring to FIG. 3, a method 300 of operations of the editor 206 commences with a step 302 of displaying a user interface of the editor 206. Using the user interface of the editor 206, a tour interface is created in a step 304. The tour interface as created in the step 304, upon completion of the method 300 to provide a complete tour, is deliverable by the CES 102 to the VS 104 for deployment on guide device(s) 108 as the complete tour.

Once the tour interface is created in the step 304, the editor 206 adds a "venue" to the tour interface in a step 306. For example, the Washington, D.C. National Mall could be a venue added to the tour interface. The particular venue added to the tour interface in any scenario is determined by the particular operations of the editor 206 at that time, and corresponds to any human user input and/or automatic implementation by the editor 206. Thereafter, in a step 308, the editor 206 adds one or more identities of particular ones of the VS 104 that service the particular designated/chosen venue.

The editor 206, in a step 310, next defines at least one "point of interest type" for the chosen venue. Each such point of interest type is a category of geographic and other information applicable to a particular location within the venue of the tour being created, for example, "Attractions", "Restrooms", "Food Service Locations", "Guide Device Return Locations", and the others. The editor 206 makes each such point of interest type a menu item of the tour for using the tour on the guide device(s) 108 during tour guiding.

Once point of interest types are defined in the step 310, the editor 206, in a step 312, defines "points of interest" for particular geographical point locations within the venue. The step 312 is performed via directions and input from a human user that is creating the tour and/or automatically by the editor 206, as applicable. The editor 206 then, in a step 314, relates or corresponds a geographic location for each such point of interest, such as GPS coordinates or the like. Example points of interest are "The Washington Monument" or "The Lincoln Memorial" in the case of the Washington, D.C. National Mall as the venue. Of course, other applicable points of interest, together with relevant geographic location, are defined in the step 312 and related/corresponded in the step 314, according to the particular venue and desires for the tour.

As to each point of interest so defined and located in the steps 312 and 314, a step 316 of the editor 206 creates, or enables creation, of content and information for the point of interest. In the step 316, the editor 206 adds multimedia content files for each point of interest. The multimedia content files are either available to the editor 206, for example, as previously created content saved in the database 212 or otherwise available, or newly created or obtained for purposes of the tour then being designed. The multimedia content is any of a wide range of information and data, including, for example, text, images, audio files, video files, and any other types of content for output by the guide device(s) 108.

If any particular point of interest has large amounts of content in the tour, a step 318 of the editor 206 creates categories for the content. For example, content categories for any particular point of interest can include "History", "Architecture", "Lincoln's Speeches", and others as applicable. The content is categorized in the step 318 by the editor 206 to be output by the guide device(s) 108 guiding the tour, via menu interfaces displayed or otherwise shown or made available for initiation at the guide device(s) 108.

After all steps have been completed in a first pass of the editor 206, the editor either exits and publishes the complete tour or the method 300 returns back to allow additional passes through particular ones or all of the steps, for editing operations as to prior steps or next additional steps. Additionally, various additional and alternative steps can be performed by the editor 206. The editor 206, in certain embodiments, can additionally include steps in methods to add daily news or daily activities content and elements, pop-up facts and the like, advertising, and other steps, either associated or relevant to particular ones of the points of interest or otherwise.

VS Controller:

The VS controller 208 of the CES 200 is software and/or hardware that serves as a centralized repository for tours, content, information and definitions for the system 100. The VS controller 208 coordinates each VS 104, and makes available to each VS 104 the applicable tours for the VS 104 and also all other details and controls for operations of the VS 104 in deployment of tours on respective guide device(s) 104. The VS controller 208 handles communications between the CES 200 and each VS 104.

A method 400 of operation of the VS controller 208 commences with a step 402 of initiating communications between the CES 200 and a respective one of the VS 104, as applicable. The step of initiating communications 402 is commenced either by the CES 200, for example, at scheduled intervals, directive to the CES 200, human intervention at the CES 200, or otherwise, or else is commenced upon the CES 200 receiving a request from one of the VS 104. After the step 402, the VS controller identifies the particular VS 104 with which then communicating, in a step 404. The identification is by specified identity of the VS 104. Then, the applicable venue for the VS 104 is determined in a step 406, by the VS controller 208 through look-up in the database 212 or otherwise, as such identity and venue of the particular VS 104 have been correlated at the CES 200.

In a step 408, the VS controller 208 causes searching of the database 212 to determine if any tours or edits to tours are then in the database 212 for the particular venue of the applicable VS 104. If the VS controller 208 in the searching 408 finds a tour or edits to tour relevant to the VS 104, the VS controller 208 communicates the particular tour or edits to the VS 104. The communication of any tour or edit to the VS 104, in a step 410, synchronizes tour and tour data/content at the VS 104 with that then maintained at the database 212 of the CES 200. The method 400 thereafter is completed, either by the VS controller 208 ending communication between the VS 104 and the CES 200 in a step 412, or after waiting for completion of the method 500 shown in FIG. 5 if any new guide device 108 reporting is logged at the VS 104 as hereafter described.

In the method 400, each VS 104 is maintained by the VS controller 208 with each applicable tour synchronized with that of the CES 200, as updated and existing at the CES 200 at the particular time of performance of the method 400.

Guide Device Reporter:

The guide device reporter 210 is also a software and/or hardware. It serves to effect communications, storage, and manipulation of information from the VS 104, regarding guide device(s) 108 usage, check-in and check-out, and other statistical and state information that the VS 104 may have.

Figure 4:
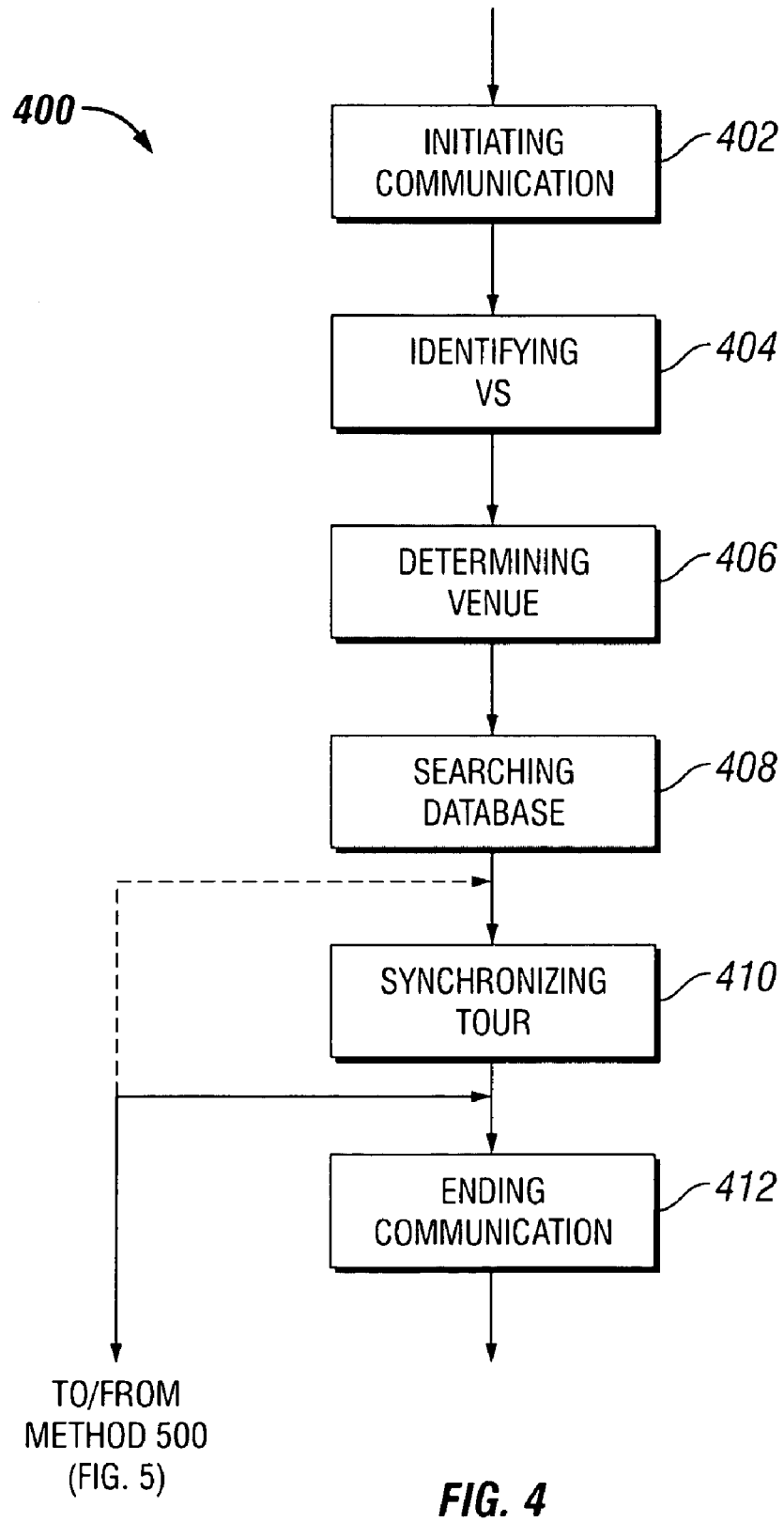
FIG. 4 illustrates a method of a venue system controller of the central editing system of FIG. 2, according to certain embodiments of the invention.
Figure 5:
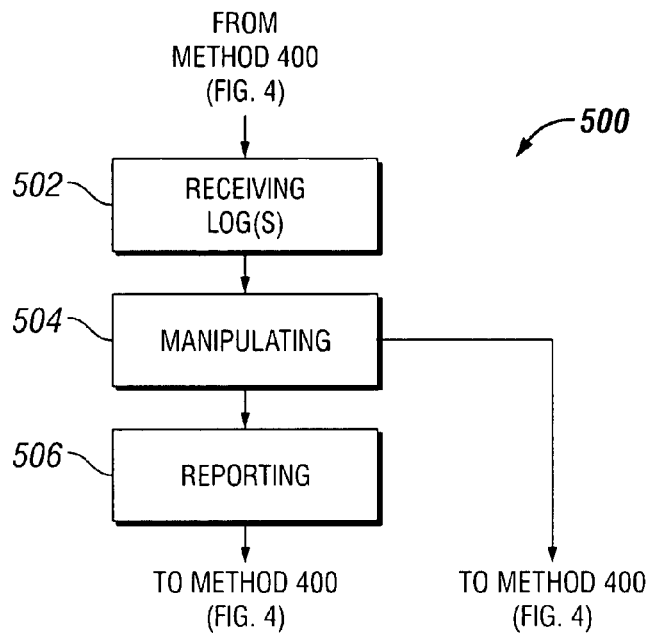
FIG. 5 illustrates a method of a guide device reporter central editing system of FIG. 2, according to certain embodiments of the invention.

Referring to FIG. 5, a method 500 is performed by the guide device reporter 210 of the CES 200. The method 500 commences either after the searching step 408 of the method 400 if there is not any new or edited tour for synchronization with the VS 104 or after the step 410 of synchronizing if any new or edited tour was found by the VS controller 208 and communicated to the VS 104 in the method 400. The phantom arrow in FIG. 4 after the step 408 indicates the performance of the method 500 in the instance where no new or edited tour. The arrow in FIG. 4 after the step 410 indicates the usual process where new or edited tour is synchronized with the VS 104 via the VS controller 208.

The method 500 commences with a step 502 of receiving from the VS 104 any new or updated log information stored at the VS 104, as gathered from guide device(s) 108. If there is not any such log information, then the method 500 ends and returns to the method 400. If new or updated log information is at the VS 104, this log information is communicated to the CES 200 via the guide device reporter 210 in the step 502.

On receiving new log information in the step 502, the log information is manipulated by the guide device reporter 210 in a step 504. In the step 504, the log information is stored, for example, in the database 212, and can be statistically or otherwise analyzed, sorted, and compiled. The method 400, then, either returns to the method 400, or if report generation is desired, a step 506 of reporting of the log information, or summaries, analyses and compilations thereof, makes the log information available for use, such as by output report generation or otherwise. After the step 506 of reporting, the method 500 returns to the method 400.

The data related to guide device(s), as obtained by the guide device reporter 210 from respective ones of the VS 104, can include guide device usage statistics, check-out and check-in patterns, statistics related to frequency of visits to certain points of interest, exception reports indicative of extraordinary occurrences (e.g., such as where a guide device has been checked-out but never checked-in at the VS 104), and other data and information obtained from the VS 104 as collected by the VS 104 from its particular guide device(s) 108. In certain embodiments, standardized sets of reports are generated by the guide device reporter 210. Such reports can be any of a wide variety of data formats, such as, for example, a flexible and reuseable format like XML. Also, the reports can be designed in a custom manner in certain embodiments, such as desired by an administrator or operator of the system 100 or otherwise.

The Venue System:

As previously discussed, the CES 102 (shown in FIG. 1) is associated and communicates with one or more VS 104. Whereas the CES 102 is located centrally, in order to control and operate the system 100 generally, one or more of the VS 104 is located in the vicinity of a venue for a tour, i.e., in the vicinity of the geographic area over which one or more An example VS 600, such as the VS 104 of FIG. 1, includes one or more computers 604, communicatively connected if more than one. Additionally, the computer 604 of the VS 600 includes or is connected to a database 612. The computer 604 (whether one or more) is communicatively connected to the database 612. The computer 604 has at least one microprocessor, memory and storage, and operating system, and can also include security and peripherals such as input and output devices, printers, and the like. The VS 600 also includes a CES synchronizer 606, a guide device synchronizer 608, and a guide device controller 610, each communicatively connected to the computer 604. The CES synchronizer 606, the guide device synchronizer 608, and the guide device controller 610 are each software and/or hardware of the VS 600, and can be included within the computer 604 (as illustrated in FIG. 6 by the box 602) or can otherwise be communicatively connected to the computer 604.

Figure 6:
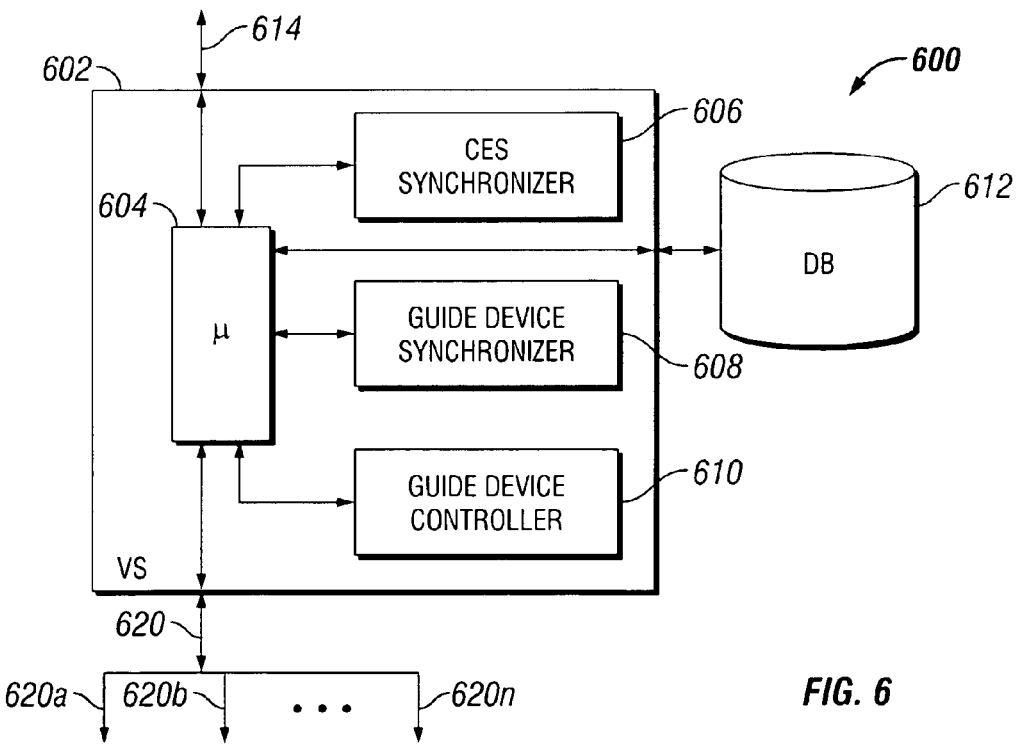
FIG. 6 illustrates a venue system of the tour system of FIG. 1, according to certain embodiments of the invention.

The database 612 can be included within the computer 604 or can otherwise be communicatively connected externally to the computer 604, for example, via a network, the Internet, or the like (as illustrated in FIG. 6). The database 612 is hardware and/or software, and is capable of maintaining data in a correlative relationship for use by the VS 600 for purposes of the system 100 (shown in FIG. 1). For example, the database 612 is a relational database, such as a SQL database like MySQL™, Oracle™, SQL Server™ or another.

External interfaces of the computer 604 of the VS 600 include at least a communicative connector 614 to the CES 102 (shown in FIG. 1), such as a WAN network like the Internet, a communicative connector to the database 612, and communicative connectors 620, 620a through 620n, to one or more guide device (s) 108 (shown in FIG. 1). The communicative connectors 620, 620a-620n, are, for example, USB, wired and/or wireless LAN, RS-232, or any other similar communicative links. The communicative connector 614 to the CES 102 provides for synchronization of tours and tour edits between the then-current tours and tour edits at the CES 102, and those of the VS 600. The communicative connectors 620, 620a-620n, provide for synchronization of each particular tour and tour edit at the VS 600, with the applicable tour for each respective guide device 108. In certain embodiments, these communicative connectors 620, 620a-620n, or other additional connectors to the VS 600, provide power charge controlled via the VS 600 to the guide device(s) when checked-in at the VS 600.

CES Synchronizer:

The CES synchronizer 606 of the VS 600 is a software program and/or hardware. The CES synchronizer 606 initiates and controls communications of the VS 600 with the CES 102, in order that tours and tour edits then at the VS 600 are synchronized with the then-current tours and tour edits at the CES 102.

Figure 7:
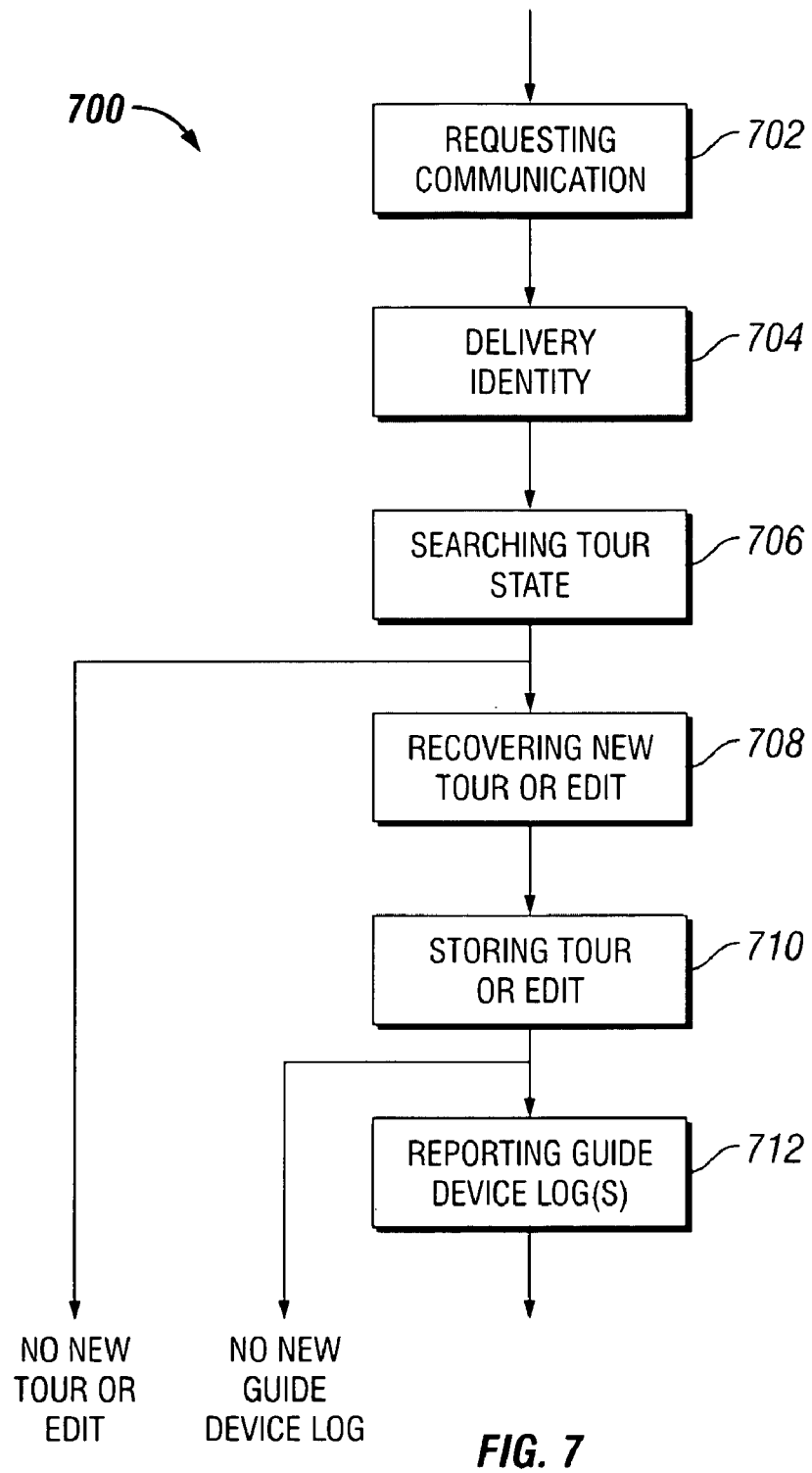
FIG. 7 illustrates a method of operation of a central editing system synchronizer of the venue system of FIG. 6, according to certain embodiments of the invention.

Referring to FIG. 7, the CES synchronizer 606 performs a method 600. The method 600, as previously described, commences with a step 702 of requesting communications with the CES 102, either first initiated by the VS 600 or per controls of the CES 102. For example, the CES synchronizer 606 of the VS 600 can periodically, as scheduled or as otherwise directed, commence and perform the step 702.

Once communications with the CES 102 are commenced, the CES synchronizer 606 in a step 704 delivers identity information for the VS 600 to the CES 102. Thereafter, communications between the CES 102 and the VS 600 continue in accordance with the prior description of the methods 400 and 500. The CES synchronizer 606 controls the VS 104 in these communications, including via a step 706 of searching the database 612 for tour and tour edit states and making the states available to the CES 102 for the CES 102 to determine whether or not there are new tour or edits at the CES 102 for the VS 600.

If no new tour or edit is thereafter received by the VS 600 from the CES 102, the method 700 of the CES synchronizer 606 ends. Otherwise, a step 708 of receiving new tour or edit is performed by the CES synchronizer 606. The CES synchronizer 606, in a step 710, then stores the received tour or edit, for example, by entering the tour or edit in the database 612, overwriting any outdated tour or edit, and otherwise making current for write by the VS 600 to the guide device(s) 108 the particular tour or edit so received.

If the VS 600 then has new guide device logging information, not previously delivered to the CES 102, the CES synchronizer 606 delivers the new log(s) to the CES 102 in a step 712. Thereafter, the method 700 ends. The step 712 is not performed prior to end of the method 700 if there is not any new log(s) at the VS 600 for delivery to the CES 102.

Guide Device Synchronizer:

The guide device synchronizer 610 of the VS 600 is software and/or hardware that writes any new tour or tour edit at the VS 600, to each respective guide device 108 upon communicative connection of the guide device 108 to the VS 600. The guide device synchronizer 610 operates at a scheduled, directed or other interval. For example, the guide device synchronizer 608 can be programmed to automatically write any new tour or edit to the guide device 108 whenever the guide device 108 is communicatively connected to the VS 600 (i.e., when the guide device 108 is not portably used for tour guidance) and the guide device synchronizer 608 is so scheduled to operate, or otherwise the guide device synchronizer 608 can automatically write to the guide device 108 upon connection to the VS 600 or as directed at the VS 600 (e.g., by a human operator or the like).

Figure 8:
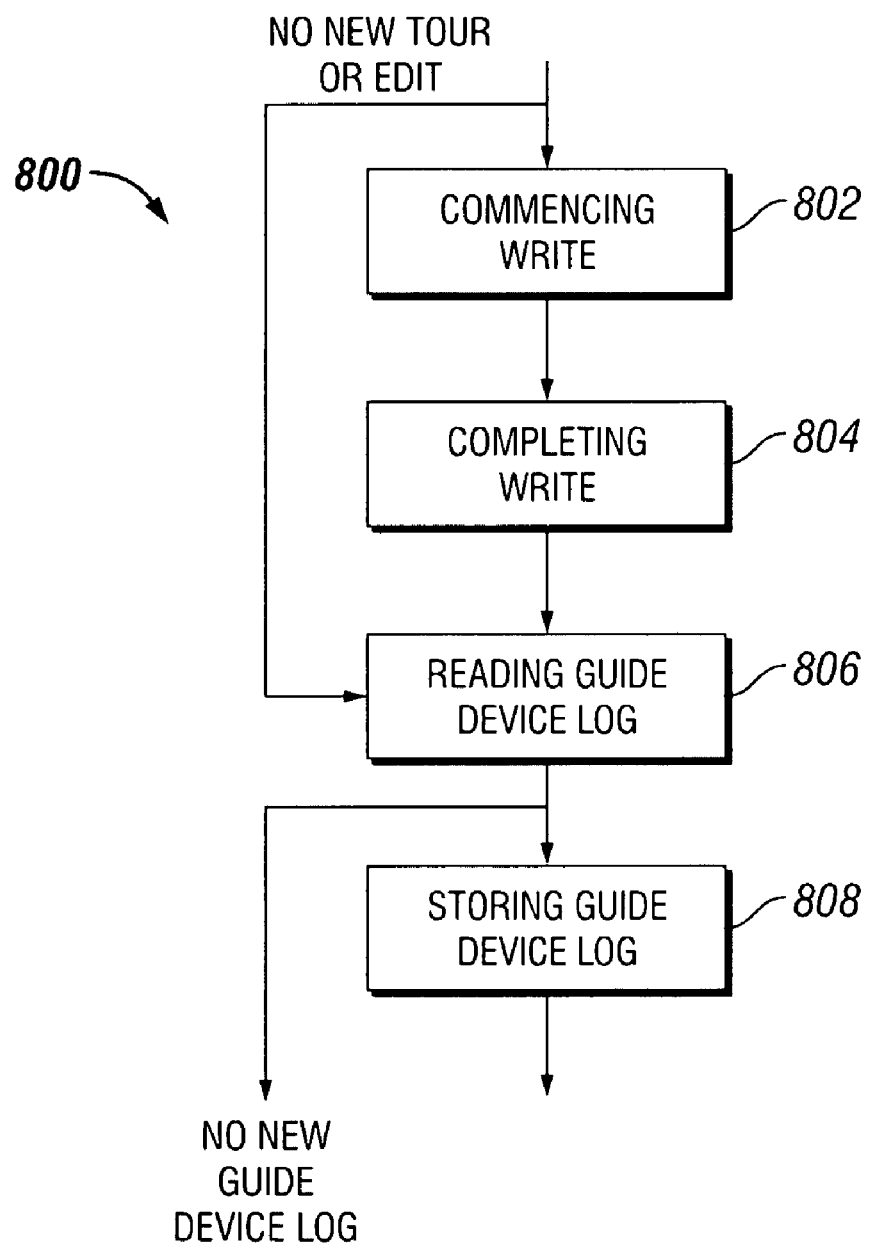
FIG. 8 illustrates a method of operation of a guide device synchronizer of the venue system of FIG. 6, according to certain embodiments of the invention.

Referring to FIG. 8, a method 800 is performed by the guide device synchronizer 608, as so programmed or directed in a step 802 of commencing to write, if there is any new tour or edit for the particular guide device 108 that is then-available as current at the VS 600. In the step 802, communications with the guide device 108 are established and the VS 600 delivers the newest tour or tour edit, as applicable, then maintained at the VS 600, to the guide device 108. During the step 802, the VS 600, via operation of the guide device synchronizer 608, controls the guide device 108 to write to memory of the guide device 108 the appropriate tour or edit. The write operation is completed in a step 804. If there is not any new tour or edit for write to the guide device 108 by the VS 600, the method 800 bypasses the steps 802 and 804 and proceeds to a step 806.

In the step 806, the guide device synchronizer 608 controls the VS 600 to read the then-currently stored log information of the guide device 108. If the log information of the guide device 108 is the same as the information about the log then maintained by the VS 600, the method 800 ends. However, if the log information of the guide device 108 differs from that then-maintained by the VS 600, the guide device synchronizer 610 stores the log information from the guide device 108 in a step 808, for example, by saving the information in the database 612. The method 800 thereafter ends.

Guide Device Controller:

Referring back to FIG. 6, the guide device controller 610 drives the interface of the VS 600 with each guide device 108 when connected to the VS 600 and either being checked-in to or checked-out from the VS 600 for portable tour guiding use of the guide device 108. Each guide device 108 corresponding to the VS 600 resides at and connected to the VS 600 when not being used portably for guiding. The guide device controller 610 performs check-out and check-in operations for the guide device 108 (e.g., automatedly and/or through input and control by an operator of the VS 600 or the like), such as when a customer/tourist obtains the guide device 108 for use and then returns it after use. The guide device controller 610 controls access and portability of the guide device 610, and aids user identification and information, including as to billing information. In certain embodiments, the guide device controller 610 can, itself, effect/perform (and/or aid in effecting and performing) electronic commerce transactions such as credit card processing or the like, in connection with check-out and payment for portable guide device 108 use.

Figure 9:
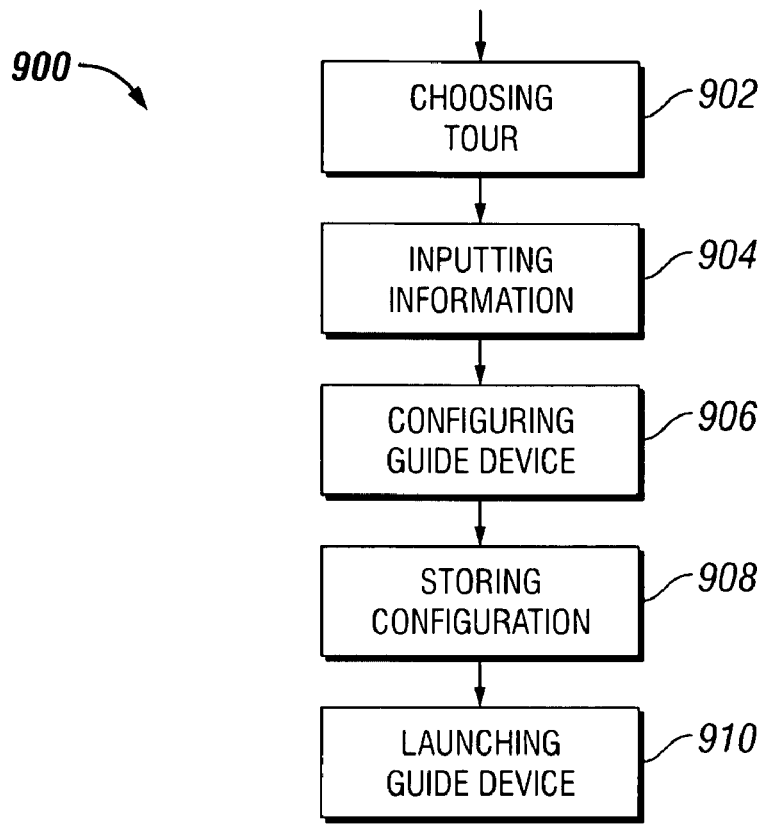
FIG. 9 illustrates a first method of operation of a guide device controller of the venue system of FIG. 6 for checking-out a guide device by the venue system, according to certain embodiments of the invention.

Referring to FIG. 9, a first method 900 of the guide device controller 610 is commenced with a step 902 for check-out. In the method 900, a potential customer/tourist (and/or an operator of the VS 600 or the like) wanting to use the guide device 108 as a portable tour guide chooses in the step 902 a particular tour for the guide device 108. For certain ones of the VS 600, and so for certain of the guide device 108, only a single tour may be selected. Certain others permit selection among more than one tour.

In a step 904 of the guide device controller 610, the customer/tourist (and/or an operator of the VS 600 or the like, in accordance with direction of the customer/tourist) inputs required information, including, for example, applicable customer/tourist address and contact information information, security deposit, type of tour desired (e.g., attractions, monuments, eating establishments, night life, etc.), desired return VS 600 location, and other possible information. The operator of the VS 600 can collect payment at the VS 600 for the portable use of the guide device 108 by the customer/tourist. In certain other embodiments, as has been mentioned, the VS 600, automatedly and/or through interaction with the customer/tourist or an operator of the VS 600, handles billing and crediting of collections for use and access to the guide device 600, in conjunction with the guide device controller 610, by electronic payment, cash input, or otherwise. Alternately, certain aspects of the guide device controller 610 operations are directable by other features of the VS 600 or a human operating the VS 600, for example, certain tour types can be subject to availability, request and approval or the like, and payment can be manually accounted for in-person, and others.

In a step 906, the guide device controller 610 controls the VS 600 and the guide device 108 to configure the guide device 108 for portable use. For example, the particular tour, user interface, and other preferences are configured on the guide device 108 in the step 906. The particular configuration for the guide device 108 is also stored at the VS 600, for example, in the database 612, in a step 908. This storage step 908 provides for redundancy, fault avoidance, and the like. Finally, in a step 910, the guide device controller signifies launching of the guide device 108. After the step 910, the guide device 108 is disconnected from the VS 600 and is then useable for portable tour guiding.

Figure 10:
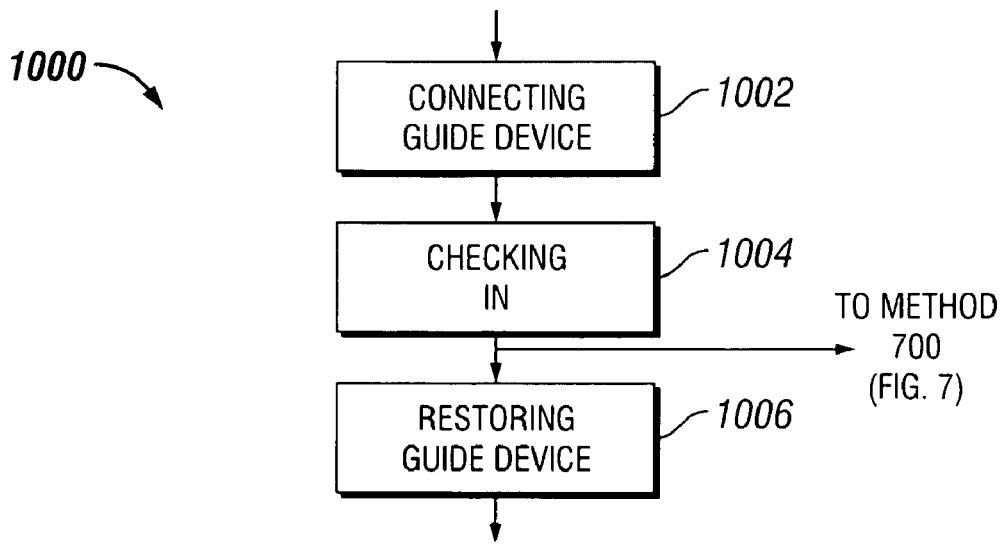
FIG. 10 illustrates a second method of operation of the guide device controller of the venue system of FIG. 6 for checking-in a guide device by the venue system, according to certain embodiments of the invention.

Referring to FIG. 10, after touring with the guide device 108, the customer/tourist having the guide device 108 returns it to the VS 600 (or, as applicable, another VS 600 so designated during configuration or otherwise determined). The guide device 108 is then checked-in by the guide device controller 610 of the VS 600 in a second method 1000, upon communicative connection of the guide device 108 to the VS 600 (i.e., via one of the connectors 620, 620a-620n).

The method 1000 is commenced in a step 1002 of connecting the guide device 1002 to the VS 600, such as by the connectors 620, 620a-620n. A step 1004 of checking-in the guide device 1004 is controlled by the guide device controller 610. In the step 1004, the VS 600 reads information from the guide device 108 to effect the check-in. 20 Alternately, the step 1004 includes the VS 600 communicating the guide device 108 check-in to the CES 102 to complete the check-in and/or a human operator at the VS 600 manually or electronically at the VS 600 effects the check-in. For example, check-in by the guide device controller 610 can include recognition of the particular guide device 108, registration of the return of the guide device 108 in the database 612 or otherwise, payment collection or refund if applicable, and others.

After the step 1004 of checking-in, the guide device controller 610 controls the VS 600 to commence retrieval and storage via the guide device synchronizer 606, of the log information that is then-current for the guide device 108, as previously described. As a final step 1006 of the method 1000, the guide device controller 610 controls the VS 600 to restore the guide device 1006 as required, for example, by charging power supply of the guide device 108, checking tour and edit corruption at the guide device 108, testing operations of the guide device 108, and similar actions.

Figure 11:
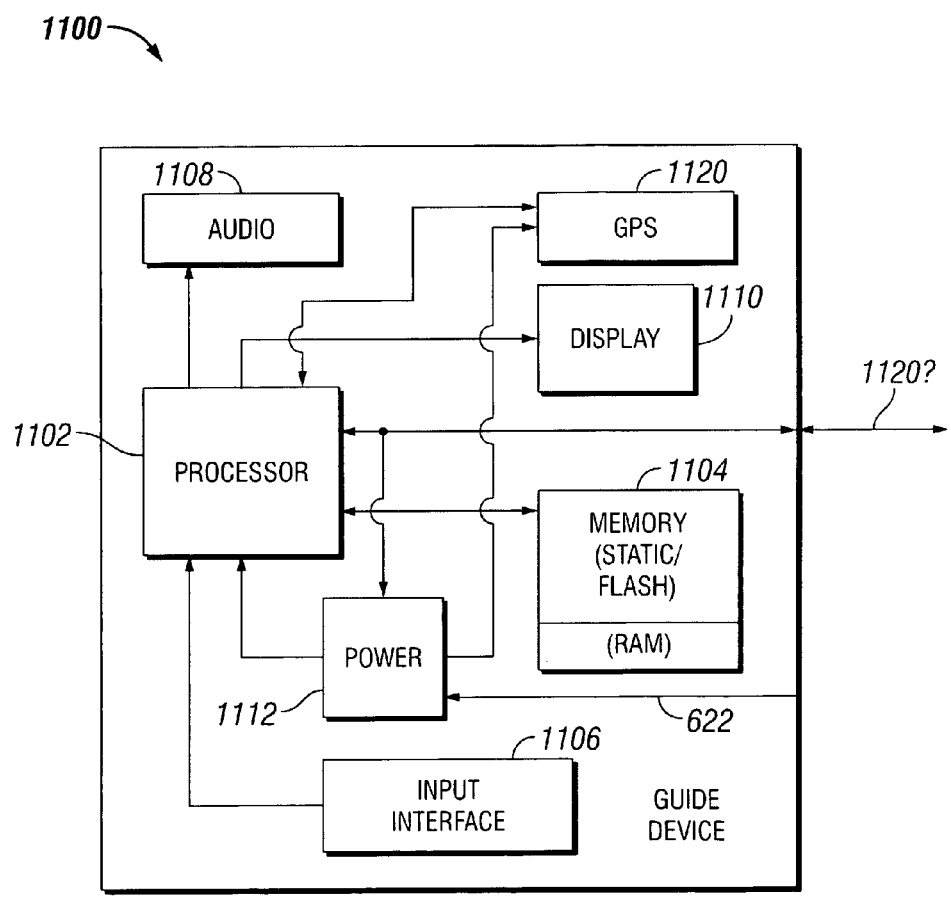
FIG. 11 illustrates a guide device of the tour system of FIG. 1, according to certain embodiments of the invention.

Guide Device:

Referring to FIG. 11, an example guide device 1100 of the system 1000, such as the guide device 108 of FIG. 1, includes a processor 1102 connected to a memory 1104, an input interface 1106, an audio output 1108, and a display 1110. The guide device 1100 also includes a power supply 1112, electrically connected to the processor 1102 and, as applicable, the display 1110, the audio output 1108, the memory 1104, and the input interface 1106. The guide device 1100 also has external connectors, such as a connector 620 to the VS 104, a connector 622 to a recharger for the power supply, RFID, and optionally other connectors to memory, networks, and other elements. In certain embodiments, the connector 620 to the VS 104 can serve both as a data communications link and also as a power supply recharger connection.

The guide device 1100 also includes a GPS receiver 1120, or other geographic position location device, such as a cellular triangulation detector or other. The GPS receiver 1120 detects and determines geographic coordinates at which the guide device 1100 is located at each instant. The guide device 1100 correlates the geographic coordinates determined by the GPS receiver 1120 with points of interest of the particular tour maintained by the guide device 1100.

Written into memory 1104 or other storage of the guide device 1100, is the tour. The tour is a software and/or hardware of the guide device 1100 and, as previously discussed, is written to the guide device 1100 by an applicable VS 104 for the guide device 1100. The guide device 1100, during portable use apart from communicative connection to the VS 104, operates or runs the tour via the processor and input/output elements of the guide device 1100. The guide device 1100 includes an operating system, for example, Windows CE or the like, that controls operations of the guide device 1100 and running of the tour on the guide device 1100.

Figure 12:
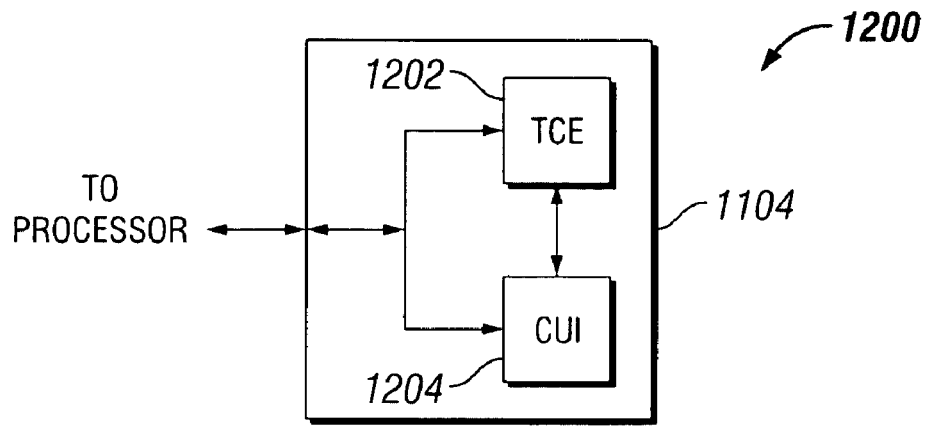
FIG. 12 illustrates a memory of the guide device of the tour system of FIG. 1, according to certain embodiments of the invention.

Referring to FIG. 12, in addition to the operating system of the guide device 1100 and the tour written to the guide device 1100, the tour and the guide device 1100 operations are controlled by a tour content engine 1202 and a customer user interfacer 1204 of the guide device 1100. Each of the tour content engine 1202 and the customer user interfacer 1204 is, for example, software saved on the memory 1104 of the guide device 1100. Alternately, the tour content engine 1202 and the customer user interfacer 1204 can be hardware, combinations of hardware and software, firmware, data communicated to the guide device 1100 from an external source (e.g., if the guide device 1100 includes communicative links, either wireless or otherwise, to other devices and systems), and combinations and other elements.

The tour content engine (TCE) 1202 of the guide device 1100 is connected to and handles communications of the guide device 1100 with the VS 104. Additionally, the TCE 1202 is connected to and retrieves, at each instant, the then-current geographic location of the guide device 1100 by communicating with the GPS chipset of the GPS receiver 1120, or as otherwise applicable. Further, the TCE 1202 is connected to and controls storage of the tour on the guide device 1100, such as in the memory 1104 or otherwise. The TCE 1202 also connects as an interface to other software and hardware of the guide device 1100 for purposes of access thereby to the tour and the current location information for the guide device 1100, and connects via the interface to a shut-down or similar switch of the guide device 1100 to restrict use or operations of the guide device 1100, for example, if moved a specified excess distance from the venue of the tour or the like. The TCE 1202 connects to other aspects of the memory 1104, as well, and stores the log information applicable to the guide device 1100.

The customer user interface (CUI) 1204 of the guide device 1100 is connected to the TCE 1202 and communicates therewith, including to periodically request geographic location from the TCE 1202. The CUI 1204 in cooperation and communication with the processor 1102, determines whether the guide device 100 is within a prescribed radial distance of any point of interest of the tour, based on geographic location data for the guide device 1100 obtained from the TCE 1202. If CUI 1204 determines that the guide device 1100 is within such prescribed radial distance of a point of interest, the CUI 1204 requests applicable content of the tour from the TCE 1202 and controls display or other output or operation with the content. When the CUI 1204 determines that the guide device 1100 is not within prescribed radial distance of any point of interest of the tour, the CUI 1204 controls display or other output or operation of the guide device 1100 interface with the user of the device 1100. As examples in such instances, the CUI 1204 can control display of pop-up facts, daily news or activities or other information, data or content intermittently, periodically or as otherwise programmed, or cause the guide device 1100 to remain idle as to user interface output.

Operations of the CUI 1204 in determining geographic location and correlating to and displaying/outputting content of the tour are continuous and repeated. The CUI 1204 is additionally, however, user directable. For example, a user of the guide device 1100 can input to the guide device to control the CUI 1204, directing it to display particular content and aspects of the tour. The CUI 1204 drives and provides a menu structure, by display or otherwise on the guide device 1100, by which the user of the device 1100 can select and input requests to obtain output of content for any point of interest of the tour or as otherwise included in the tour. The menu structure can, for example, operate as a sort by point of interest type if the user seeks content for certain types of locations, such as restroom facilities, attractions, restaurants, or other. The guide device 1100, therefore, need not necessarily be located at a particular geographic location correlated to specific content, in order to obtain output/display of the content. Nonetheless, only certain or portions of the content of the tour can be made requestable or outputtable in this manner, as desired for the particular tour and guide device 1100, and as programmed per the tour, content and/or CUI 1204. The CUI 1204 can furthermore be programmed as desired for a particular tour, content or use, such as, for example, to include "recommended" routes, to display travel paths and routes to next locations, and to provide other desired options for the application and use.

Figure 13:
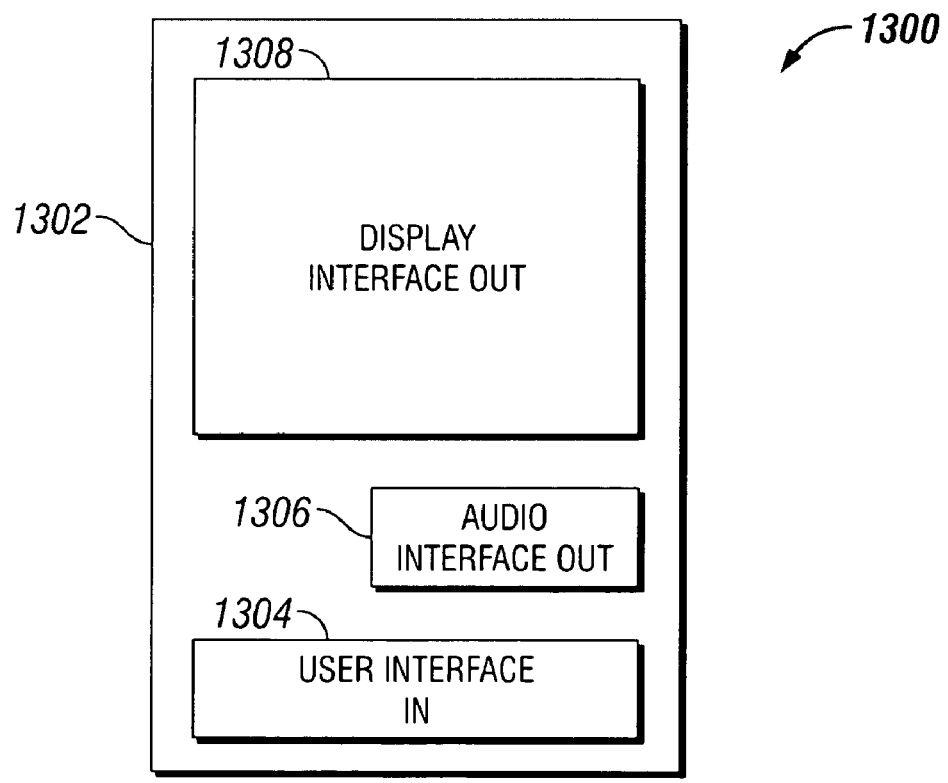
FIG. 13 illustrates a front view of a housing of the guide device of FIG. 1, according to certain embodiments of the invention.

Referring to FIG. 13, a housing 1300 of the guide device 1100 includes a case or enclosure 1302, a display screen 1308, an audio output 1306, and a user input device 1304. In certain embodiments, the enclosure is formed of a rigid plastic and includes frames for containing within the enclosure 1302 the guide device internals, including the processor 1102, memory 1104, GPS receiver 1120 and other elements. The display screen 1308 is, for example, an LED, touch screen, plasma, LCD, or similar display. The audio output 1306 is a speaker sufficient to output audio of volumes for the user of the guide device 1100, and can include volume and/or tone controls, synthesizers, and the like as desired. The user input device 1304 is any form of keys, touch screen, switches, buttons, RFID, and other inputs or combinations thereof. The enclosure 1302 of the housing 1300 also has throughway channels formed to accept and provide connectors and connection links of the device 1100 with the VS 104 and other devices.

Alternatives, additions, and modifications to the guide device 1100, including its internal elements, housing, memory, and communicative links and connectors, are possible. Many of these will be known and appreciated by those skilled in the art. For example, the guide device 1100 can include wireless connectors and related elements, such as infrared, cellular wireless, satellite, 802.11, Bluetooth , or other present or future communicative paths. Although the guide device 1100 is contemplated as including the complete tour, rather than requiring any further supplementation or additional data, a wirelessly connectable guide device can include features to access other data and information, such as the Internet or other sources.

EXAMPLE

Figure 14:
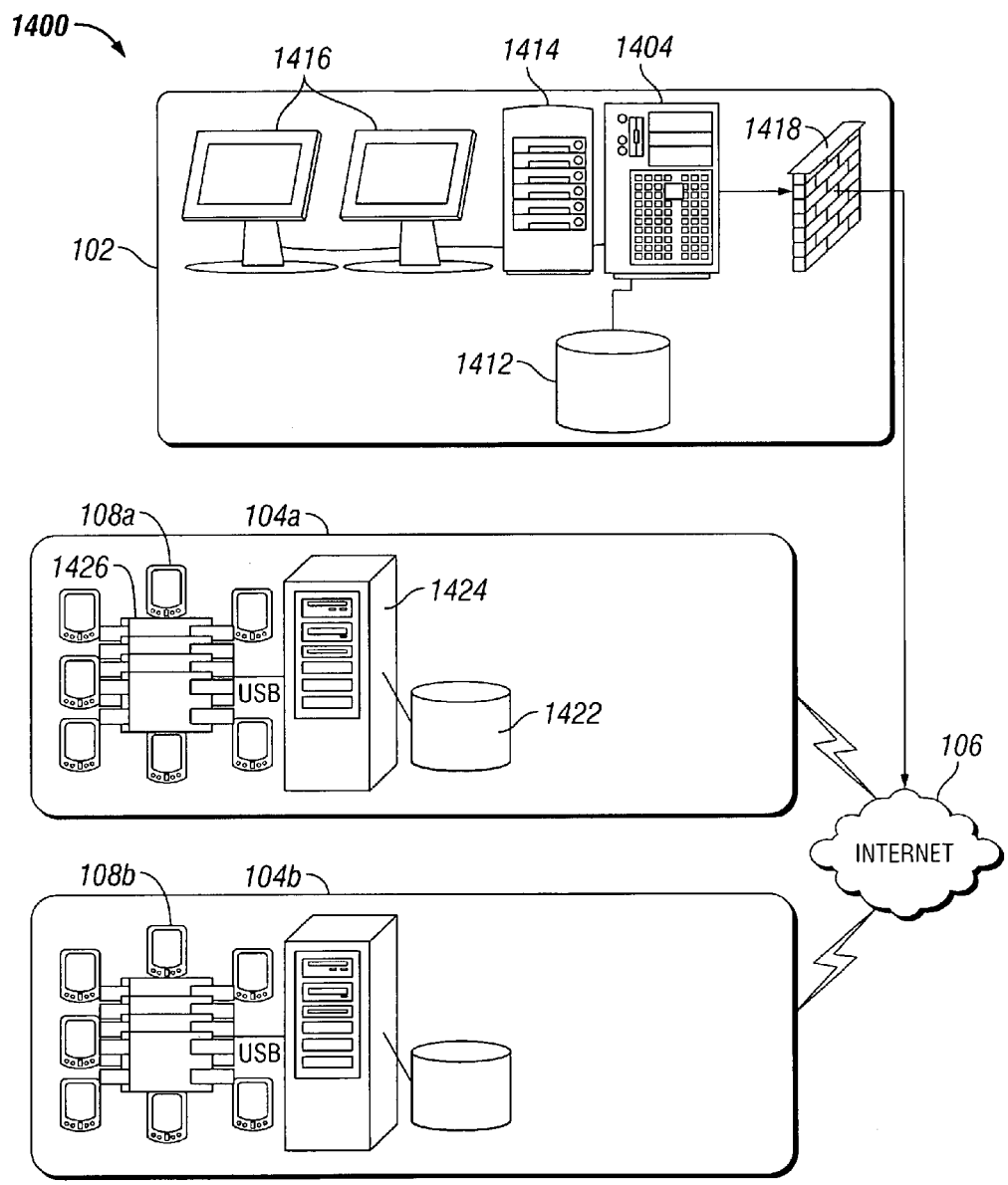
FIG. 14 illustrates an exemplary implementation of an example system, like that of the tour system of FIG. 1, according to certain embodiments of the invention.

Referring to FIG. 14, a particular example system 1400, being a possible implementation of the system 100, includes the CES 102, connected via the Internet 106 to the VS 104, i.e., here a first VSA 104a and a second VSB 104b. Each of the first VSA 104a and the second VSB 104b is connected to several guide devices 108a and 108b, respectively. In the example system 1400, the CES 102 includes a server computer 1404, a content and transational database 1412, a high capacity disk storage 1414, and flat display screens 1416, each interconnected and located at a central location of the CES 102. The CES 102 also includes a firewall 1418 between the Internet 106 and the other elements of the CES 102, for data and communications security purposes.

Each of the first VSA 104a and the second VSB 104b are geographically remotely located from the CES 102, such as at respective remote venues. Each respective venue has at least one applicable tour, and the tour(s) are created, edited and stored at the CES 102. Each of the first VSA 104a and the second VSB 104b are communicatively connected via the Internet 106 to the CES 102. The CES 102 operates to deliver the respective tour and edit, together with multimedia content thereof, to the respective one of the first VSA 104a or the second VSB 104b, as previously discussed.

At each respective one of the first VSA 104a and the second VSB 104b, the respective guide devices 108a and 108b are located and connected to the first VSA 104a or the second VSB 104b, as applies. In the example system 1400, the first VSA 104a and the second VSB 104b each include a venue server computer 1424, a database 1422, and a guide device connector 1420. The database 1422 maintains the current version of the tour (or tours, as applicable) that is at the VS, and relates the tour to the particular ones of the guide devices. The database 1422 also maintains the current log information for each of the particular ones of the guide devices.

A USB switch and cradle 1426 connected to the venue server computer 1424 and the guide devices 108, in the case of each VS, provides communicative link of the guide devices 108 to the venue server computer 1424. Additionally, the USB switch and cradle 1426 deliver recharge power to each guide device 108 connected thereto.

As previously described, each of the first VSA 104a and the second VSB 104b synchronize respective tour and edit information and content with the CES 102 via Internet communications. Each of the first VSA 104a and the second VSB 104b also synchronize the tour and edit information and content from the CES 102 with each of the respective guide devices 108. The first VSA 104a and the second VSB 104b control check-in and check-out of respective guide devices 108, for portable use in tour guiding. Log information of each of the respective guide devices 108 is read and maintained by the applicable one of the first VSA 104a and the second VSB 104b, and this log information is communicated by each VS to the CES 102 as required for maintaining current the log information at the CES 102. Billing and other controls are also included and performed by each of the first VSA 104a and the second VSB 104b.

Figure 15:
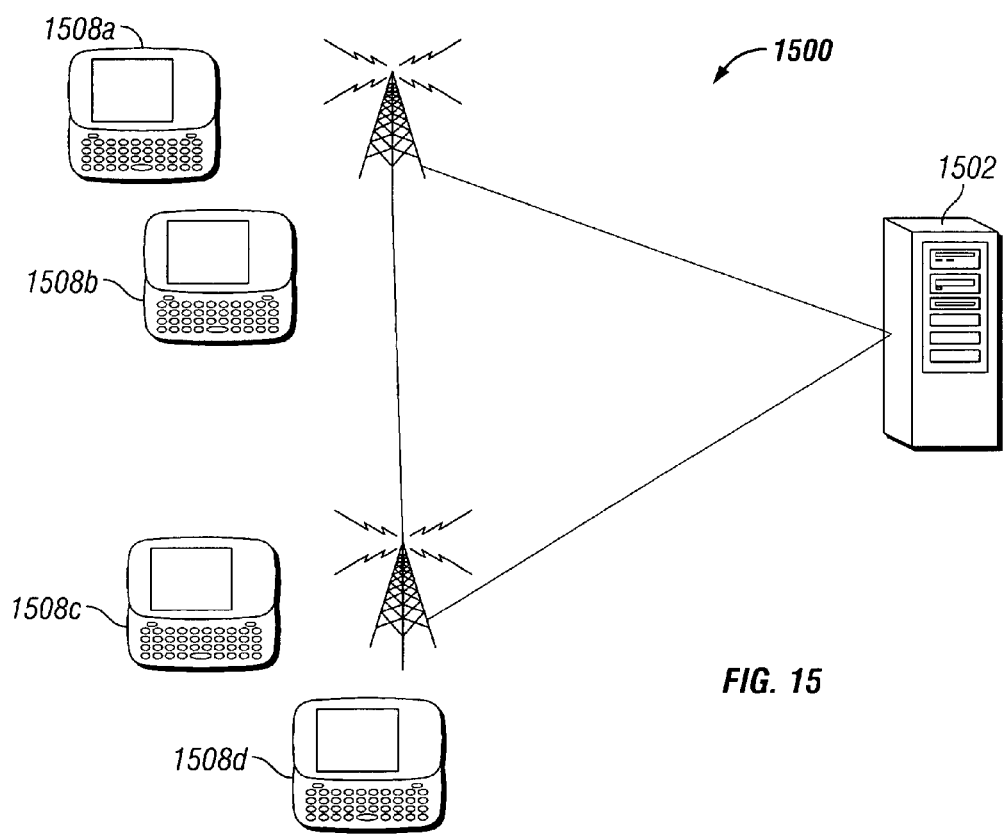
FIG. 15 illustrates an alternative communicative connection of a venue system and guide devices, including a wireless communications link for push of tour and edit information by the venue system to the guide devices, according to certain embodiments of the invention.

Other alternatives are possible in keeping with the foregoing and all such alternatives are included herein. For example, referring to FIG. 15, a wireless push system 1500 provides wireless communications links connect the venue server 1502 with the guide devices 1508a-d. Other aspects of the CES 102 (not shown in FIG. 15) and the venue server 1502 are as previously discussed. In the system 1500, the venue server 1502 wirelessly communicates with the guide devices 1508a-d to push the tour and edits, together with multimedia content, to each respective device 1508a-d. The wireless link in the system 1500 is, for example, cellular wireless, localized wireless via 802.11 hot spots or the like, infrared, Bluetooth™ or other present or future wireless communications link. The system 1500, depending on the implementation and application, pushes over wireless channels all tour and edit data. Alternately, the wireless channels serve merely for updating or tour and edit data or the like. Also, log information of each guide device 1508a-d is communicated wirelessly to the venue server 1502, or otherwise via other connections.

Other embodiments of the guide device include configurations of the device for use in transport vehicles, such as taxis, cars, buses, freight carriers, and the like. In such embodiments, the guide device is designed with features for input and output user interfaces suitable for the use. Also, features for fixing, securing and/or incorporating the device into otherwise standard panels, seats, headrests, and the like are possible. In certain embodiments of the guide device for such use and/or other applications, including walking tours and other movement within a venue, the guide device can include advertisements in or as the tour. For example, such an "advertisement" can be any non-geographical dependent content or piece of data, a marketing ad, or an item of interest that is not necessarily tour-specific in the context of the tour but that appears at a time during the tour, such as a promotional ad for a restaurant, entertainment establishment or other fact of possible interest. In certain embodiments, the advertisement appears at a time of the tour which is not dependent on geographic location, for example, at discretion of the tour designer that may be an opportune instance. In other embodiments, an advertisement could alternatively be designed to appear when a person or transport vehicle having the guide device nears the restaurant, establishment, or otherwise. In any such instance, the typical tour can deliver a pop-up ad or output an ad for the restaurant, establishment, or other fact or information. Of course, numerous marketing and advertising possibilities are presented by the guide device, including its log information. Advertisers or others can use log information in marketing decisions, surveys, and in other business respects. Furthermore, inputs to the guide device by users can trigger or facilitate targeting of advertisements, marketing and the like, to correspond with user interests and other considerations.

Of course, numerous alternatives, changes, modifications, additions and substitutions can be made in particular elements, devices, communications links, tours, geographic locators, and other aspects of the foregoing. In this regard in the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises", "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of tour guiding, comprising the steps of:
    creating a tour at a first location, for a venue at a remote location;
    communicating the tour to a venue system at the venue at the remote location from the first location;
    providing a portable tour guide device for delivering multimedia output of the tour;
    connecting the portable tour guide device to the venue system at the remote location of the venue system;
    writing the tour to the portable tour guide device at the remote location where connected to the venue system;
    disconnecting the portable tour guide device from the venue system;
    moving the portable tour guide device within the venue as disconnected from the venue system;
    outputting multimedia of the tour by the portable tour guide device;
    identifying a geographical coordinate of a point of interest within the venue of the tour;
    correlating the geographical coordinate for the point of interest to certain of the tour;
    detecting a location of the portable tour guide device within the venue, corresponding to the geographical coordinate;
    outputting the certain of the tour by the portable tour guide device, automatically, upon the step of detecting;
    editing the tour at the first location, to obtain an edited tour;
    second connecting the portable tour guide device to the venue system at the remote location of the venue system;
    overwriting the tour of the portable tour guide device by the edited tour, at the remote location where connected to the venue system;
    second disconnecting the portable tour guide device from the venue system;
    second moving the portable tour guide device within the venue as disconnected from the venue system; and
    second outputting multimedia of the edited tour by the portable tour guide device.

2. The method of claim 1, wherein the step of editing comprises the steps of:
    second identifying the geographical coordinate of the point of interest within the venue of the edited tour;
    correlating the geographical coordinate for the point of interest to certain edits of the tour;
    second detecting the location of the portable tour guide device within the venue, corresponding to the geographical coordinate; and
    outputting the certain of the edited tour by the portable tour guide device, automatically, upon the step of second detecting.

3. The method of claim 1, further comprising the steps of:
    logging a use information of the portable tour guide device, by the portable tour guide device during the step of moving;
    reading the use information from the step of logging after the step of second connecting; and
    communicating the use information from the step of reading by the venue system at the remote location to the first location.

4. The method of claim 2, further comprising the step of:
    reporting at least certain of the use information at the first location.

* * * * *